United States Patent
Ning et al.

(10) Patent No.: US 12,334,772 B2
(45) Date of Patent: Jun. 17, 2025

(54) CARRIER SIGNAL GENERATOR AND UNINTERRUPTIBLE POWER SUPPLY COMPRISING SAME

(71) Applicant: Santak Electronic (Shenzhen) Co., Ltd., Guang Dong (CN)

(72) Inventors: Huahong Ning, Guang Dong (CN); Dengke Zhang, Guang Dong (CN); Lei Cao, Shenzhen (CN); Dan Liu, Shenzhen (CN); Qinghui Ding, Guang Dong (CN)

(73) Assignee: Santak Electronic (Shenzhen) Co., Ltd. (CN)

( * ) Notice: Subject to any disclaimer, the term of this patent is extended or adjusted under 35 U.S.C. 154(b) by 0 days.

(21) Appl. No.: 18/465,211

(22) Filed: Sep. 12, 2023

(65) Prior Publication Data

US 2024/0097483 A1    Mar. 21, 2024

(30) Foreign Application Priority Data

Sep. 15, 2022   (CN) .......................... 202211123035.5

(51) Int. Cl.
  *H02J 9/06*   (2006.01)
  *H02J 7/00*   (2006.01)
  *H02J 7/34*   (2006.01)

(52) U.S. Cl.
  CPC ............ *H02J 9/061* (2013.01); *H02J 7/0047* (2013.01); *H02J 7/342* (2020.01)

(58) Field of Classification Search
  CPC ............ H02J 9/061; H02J 9/062; H02M 1/10
  See application file for complete search history.

(56) References Cited

U.S. PATENT DOCUMENTS

| | | | | |
|---|---|---|---|---|
| 7,495,415 B2 * | 2/2009 | Kanouda | ............. | H01M 50/253 320/112 |
| 2002/0186576 A1 * | 12/2002 | Kanouda | ................. | H02J 9/061 363/125 |
| 2003/0048006 A1 * | 3/2003 | Shelter, Jr. | ............. | H02J 9/061 307/64 |

FOREIGN PATENT DOCUMENTS

KR      20010008472 A  *  2/2001

* cited by examiner

*Primary Examiner* — Ryan Johnson
(74) *Attorney, Agent, or Firm* — Stanek Lemon Crouse & Meeks, PA

(57) ABSTRACT

Carrier signal generators are provided. The carrier signal generator includes a master processing module and a plurality of slave processing modules. Each slave processing module is used to control a corresponding one of universal power units of the UPS. The slave processing modules output, according to a synchronously received reference signal, control signals to control the universal power units to receive power from the mains or a rechargeable battery. When the mains is normal, each slave processing module synchronously generates a three-phase rectification control signal to rectify and output power from the mains. When the mains is abnormal, each slave processing module generates a first DC-DC control signal independently of the reference signal output by the master processing module, so as to convert and output power from the rechargeable battery. The carrier signal generator has improved compatibility and improved current conversion quality and is low cost.

14 Claims, 8 Drawing Sheets

CARRIER SIGNAL GENERATOR AND UNINTERRUPTIBLE POWER SUPPLY COMPRISING SAME

CROSS-REFERENCE TO RELATED APPLICATION

The present application claims priority to Chinese Patent Application No. 202211123035.5, filed on Sep. 15, 2022, the content of which is hereby incorporated herein by reference as if set forth in its entirety.

TECHNICAL FIELD

The present inventive concept relates generally to the field of power electronics, and more particularly to a carrier signal generator and an uninterruptible power supply including the same.

BACKGROUND

Conventional carrier signal generators generally use dedicated digital signal processing (DSP) chips to execute pre-packaged control logic and to output corresponding pulse width modulation signals. Although DSP chips have relatively high computing efficiency, the chips have limited expandability and cannot be compatible with a variety of hardware circuits. In addition, where an uninterruptible power supply (UPS) has a plurality of parallel-operated universal power modules (UPMs), each UPM is arranged to selectively supply, to a load, AC power from the three-phase mains or DC power from a rechargeable battery. If the carrier signal generator cannot synchronously send a control signal to each UPM, it is easy to generate undesired harmonics and pollute the grid due to phase asynchrony or mismatch during three-phase AC power rectification. If another carrier signal generator for synchronously outputting a rectification control signal is simply added, since the frequency of the synchronous rectification control signal is quite different from the frequency of a pulse width modulation signal for DC-DC conversion, it may be difficult for the carrier signal generator to compatibly output a pulse width modulation signal for controlling DC-DC conversion.

SUMMARY

In view of the above technical problems, a first aspect of the present inventive concept provides a carrier signal generator for an uninterruptible power supply, the uninterruptible power supply including N universal power units, each of the N universal power units supplying an uninterruptible power supply output from mains or a rechargeable battery to a load. The carrier signal generator includes: a master processing module for outputting a corresponding reference signal according to a normal or abnormal state of the mains supplying power to each of a plurality of universal power units of the uninterruptible power supply; and N slave processing modules, having input terminals coupled to the master processing module, and output terminals coupled to corresponding universal power units. The slave processing modules are used to synchronously receive the reference signal and to control the corresponding universal power units to receive power from the mains or a corresponding rechargeable battery. When the mains is normal, each slave processing module generates a three-phase rectification control signal synchronized with the reference signal, and the three-phase rectification control signal is configured to control a corresponding universal power unit, so that the N universal power units synchronously rectify and output power from the mains. When the mains is abnormal, the N slave processing modules generate corresponding first DC-DC control signals independently of each other, and each first DC-DC control signal is configured to control a corresponding universal power unit so as to perform DC conversion and output power from the corresponding rechargeable battery.

In some embodiments, the master processing module of the carrier signal generator may include a first digital signal processing chip, and the slave processing module may include a second digital signal processing chip and a complex programmable logic device chip.

In further embodiments, the second digital signal processing chip of the carrier signal generator may include a main signal generation module, an independent signal generation module, and a follower signal generation module. The main signal generation module receives the reference signal and generates a first intermediate-stage signal according to the reference sigma. The master processing module determines that the mains is normal, the follower signal generation module generates a second intermediate-stage signal according to the main signal generation module, and the complex programmable logic device chip outputs the three-phase rectification control signal according to the first and second intermediate-stage signals.

In still further embodiments, when the master processing module determines that the mains is normal and an electric quantity of the rechargeable battery for the corresponding universal power unit is lower than a predetermined threshold, the independent signal generation module generates a third intermediate-stage signal independently of the reference signal, the complex programmable logic device chip outputs a second DC-DC control signal according to the third intermediate-stage signal, and the second DC-DC control signal controls the corresponding universal power unit to supply DC power to two ends of the rechargeable battery.

In some embodiments, when the master processing module determines that the mains is abnormal, the independent signal generation module independently generates a fourth intermediate-stage signal, and the follower signal generation module synchronously generates a fifth intermediate-stage signal according to the fourth intermediate-stage signal. The complex programmable logic device chip generates the first DC-DC control signal according to the fourth and fifth intermediate-stage signals.

In further embodiments, the complex programmable logic device chip can be replaced with a field-programmable gate array chip.

In still further embodiments, the universal power unit includes first and second leg units. The first leg unit include a positive-terminal leg connected between a positive electrode of the rechargeable battery and a positive DC bus, and a negative-terminal leg connected between a negative electrode of the rechargeable battery and a negative DC bus, and the first leg unit is used to provide a bidirectional DC path between the rechargeable battery and the positive and negative DC buses. The second leg unit includes first, second and third rectification circuits, wherein an input terminal of the first rectification circuit is selectively connected to a first phase of the mains or the positive electrode of the rechargeable battery, an input terminal of the second rectification circuit is selectively connected to a second phase of the mains or the negative electrode of the rechargeable battery, an input terminal of the third rectification circuit is connected to a third phase of the mains, and output terminals of the first, second and third rectification circuits are connected in parallel to the positive and negative DC buses.

In some embodiments, when the master processing module determines that the mains is abnormal, the input terminals of the first and second rectification circuits are configured to be connected to the positive and negative electrodes of the rechargeable battery, respectively, and the first DC-DC control signal controls the positive-terminal leg and the negative-terminal leg of the first leg unit and the first and second rectification circuits of the second leg unit to perform interleaved boosting to output power from the rechargeable battery to the load.

In further embodiments, when the master processing module determines that the mains is normal, the input terminals of the first and second rectification circuits are configured to be connected to the first and second phases of the mains, respectively, and the three-phase rectification control signal controls the first, second and third rectification circuits to rectify and output a three-phase AC voltage of the mains to the positive and negative DC buses.

In still further embodiments, when the master processing module determines that an electric quantity of the rechargeable battery for the corresponding universal power unit is lower than a predetermined threshold, the second DC-DC control signal controls the positive-terminal leg and the negative-terminal leg of the first leg unit to charge a voltage on the positive and negative DC buses to two ends of the rechargeable battery.

In some embodiments of the present inventive concept, an uninterruptible power supply system is provided including a plurality of universal power units and the carrier signal generator, wherein a first end of the universal power unit is connected to one of mains or a rechargeable battery, and a second end of the universal power unit is connected to a load, and according to the control signals generated by the carrier signal generator, the mains or the rechargeable battery is controlled to supply power to the load, and/or the rechargeable battery is charged by the mains. The control signals are configured to control the respective universal power units synchronously.

The carrier signal generator according to some embodiments of the present inventive concept adopts the architecture in which a digital signal processing chip is combined with a complex programmable logic device (CPLD) chip or a field-programmable gate array (FPGA) chip. The carrier signal generator can synchronously provide rectification pulse width modulation signals to the respective universal power units according to the reference signal during mains rectification, so as to reduce harmonics, and can also independently generate pulse width modulation signals for DC-DC conversion of the leg dual-use current conversion circuit without following the reference signal when powered by the battery. Furthermore, the carrier signal generator can further compatibly output control signals for a conventional three-level current conversion circuit. Therefore, the carrier signal generator may have improved power conversion efficiency and quality and expanded applicability and is low cost.

BRIEF DESCRIPTION OF THE DRAWINGS

Embodiments of the present inventive concept are further described below with reference to the accompanying drawings.

DETAILED DESCRIPTION OF THE EMBODIMENTS

In order to make the objectives, technical solutions and advantages of the present inventive concept clearer, the present inventive concept is further described in detail below through specific embodiments with reference to the accompanying drawings.

Figure 1:
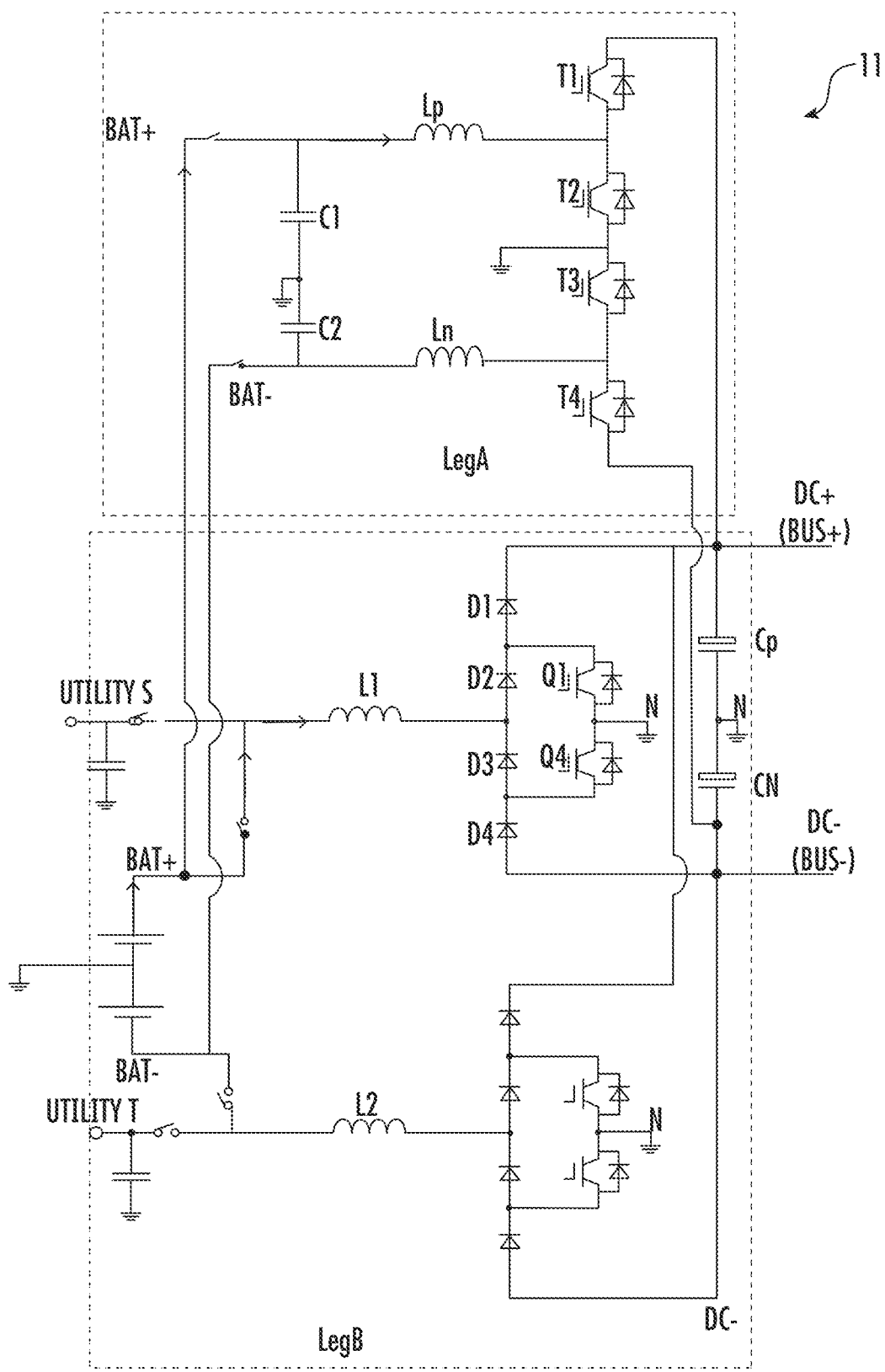
FIG. 1 is a schematic diagram illustrating a leg dual-use current conversion circuit controlled by the carrier signal generator according to some embodiments of the present inventive concept.

Referring first to FIG. 1, a schematic diagram of a leg dual-use current conversion circuit controlled by the carrier signal generator in accordance with some embodiments of the present inventive concept will be discussed. As illustrated, a leg dual-use current conversion circuit 11 includes a first leg unit LegA and a second leg unit LegB. The first leg unit LegA includes four insulated gate bipolar transistors T1, T2, T3 and T4 connected in series in the same direction, each transistor having an anti-parallel diode, wherein a collector of T1 is connected to a positive DC bus DC+, and an emitter of T4 is connected to a negative DC bus DC−; a node formed by connecting an emitter of T1 to a collector of T2 is connected to a positive electrode BAT+ of a rechargeable battery through a positive-terminal inductor Lp and a DC switch, and a node formed by connecting an emitter of T3 to a collector of T4 is connected to a negative electrode BAT− of the rechargeable battery through a negative-terminal inductor Ln and a DC switch; and a node formed by connecting an emitter of T2 and a collector of T3 is connected to a neutral point. Capacitors C1 and C2 connected in series are further connected between the positive electrode BAT+ and negative electrode BAT− of the rechargeable battery, and a node formed by connection between the two is also connected to a neutral point. The transistors T1, T2 and the positive-terminal inductor Lp constitute a positive-terminal leg of the first leg unit LegA, and the transistor T3, T4 and the negative-terminal inductor Ln constitute a negative-terminal leg of the first leg unit Legg. Thus, the positive-terminal leg is connected between the positive DC bus DC+ and the positive electrode BAT+ of the rechargeable battery, the negative-terminal leg is connected between the negative DC bus DC- and the negative electrode BAT− of the rechargeable battery, and the positive-terminal leg and the negative-terminal leg together constitute a DC boost (BOOST) circuit for providing discharging from the positive and negative electrodes of the rechargeable battery to the positive and negative DC buses, and a DC buck (BUCK) circuit for providing charging from the positive and negative DC buses to the positive and negative electrodes of the rechargeable battery.

The second leg unit LegB includes three rectification circuits having the same internal structure, i.e., R-phase, S-phase, and T-phase dual boost rectification circuits. FIG. 1 only shows the S-phase dual boost rectification circuit connected to phase S of the mains (Utility S) and the T-phase dual boost rectification circuit connected to phase T of the mains (Utility T) without showing the R-phase dual boost rectification circuit. Taking the S-phase dual boost rectification circuit as an example, the S-phase dual boost rectification circuit includes: four diodes D1, D2, D3 and D4 connected in series in the same direction between the positive DC bus DC+ and the negative DC bus DC−; a first insulated gate bipolar transistor Q1 and a second insulated gate bipolar transistor Q4 connected in series in the same direction, each transistor having an anti-parallel diode; an inductor L1; and AC and DC switches. A cathode of the first diode D1 is connected to the DC bus DC+, and an anode of the fourth diode D4 is connected to the negative DC bus DC−; an anode of the first diode D1 is connected to a cathode of the second diode D2 to form a first node, an anode of the second diode D2 is connected to a cathode of the third diode D3 to form a second node, and an anode of the third diode D3 is connected to a cathode of the fourth diode D4 to form a third node; a node formed by connecting an emitter of Q1 to a collector of Q4 is connected to a neutral point, a collector of Q1 is connected to the first node, and an emitter of Q4 is connected to the third node; and one end of a third inductor L1 is connected to the second node, and the other end of the third inductor L1 is separately connected to phase S of the mains and the positive electrode BAT+ of the rechargeable battery through the AC and DC switches.

The internal structure of the T-phase dual boost rectification circuit is the same as that of the S-phase dual boost rectification circuit. The T-phase dual boost rectification circuit is different from the S-phase dual boost rectification circuit in the connection relationship between the T-phase dual boost rectification circuit and the rechargeable battery, that is, the other end of a fourth inductor L2 of the T-phase dual boost rectification circuit is separately connected to phase T of the mains and the negative electrode BAT− of the rechargeable battery through AC and DC switches. The S-phase and T-phase dual boost rectification circuits will be described in detail below as a circuit part of the second leg unit LegB when participating in dual-use leg operations. In addition, the R-phase dual boost rectification circuit, which is not shown in FIG. 1 for the sake of simplicity of description, is not connected to the rechargeable battery, so that its inductor only needs to be connected to phase R of the mains through an AC switch, and there is no need to configure a DC switch.

Figure 2A:
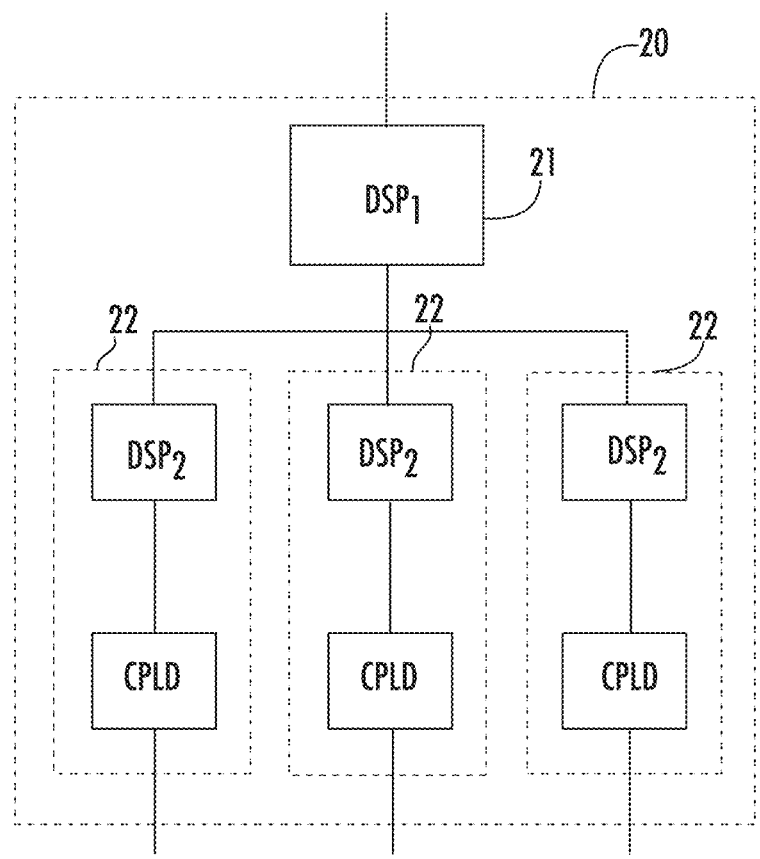
FIG. 2A is a schematic diagram illustrating a topological structure of a carrier signal generator according to some embodiments of the present inventive concept.

Referring now to FIGS. 2A and 28, FIG. 2A shows a schematic diagram of a topological structure of a carrier signal generator according to some embodiments of the present inventive concept. FIG. 28 illustrates a topological structure of a carrier signal generator arranged in an uninterruptible power supply (UPS) according to some embodiments of the present inventive concept.

As shown in FIG. 2A, a carrier signal generator 20 includes a master processing module 21 and a plurality of slave processing modules 22. The master processing module 21 includes a first DSP chip $DSP_1$, and each slave processing module 22 includes a second DSP chip $DSP_2$ and a CPLD chip. For each slave processing module 22, the second DSP chip $DSP_2$ thereof is configured to be able to receive a reference signal sent by the first DSP chip of the master processing module 21, to perform processing according to the reference signal to obtain an intermediate-stage signal, and to send the intermediate-stage signal to an input terminal of the corresponding CPLD chip, and the CPLD chip receives the intermediate-stage signal and outputs, according to the intermediate-stage signal, a control signal for performing pulse width modulation.

Figure 2B:
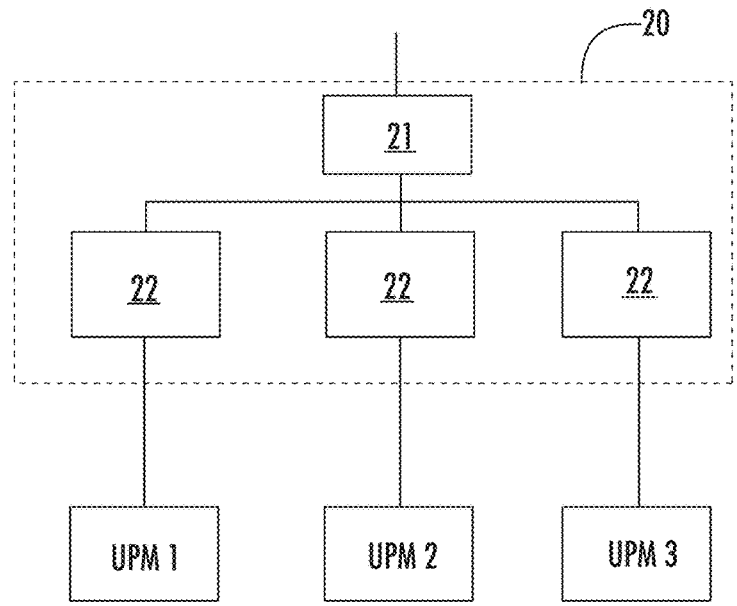
FIG. 2B is a schematic diagram illustrating a topological structure of a carrier signal generator arranged in an uninterruptible power supply (UPS) according to some embodiments of the present inventive concept.

As shown in FIG. 2B, an uninterruptible power supply (UPS) has a plurality of universal power modules (UPMs) working in parallel. By way of example and without limitation, three UPMs are shown in FIG. 2B. Hence, the carrier signal generator 20 should include at least three slave processing modules 22 to each generate a third stage pulse width modulation signal for controlling a corresponding UPM.

The reference signal, the intermediate-stage signal and the control signal may be, for example, six-channel signals, including three pulse width modulation control signals respectively corresponding to phase R, phase S and phase T of AC power, and three periodic polarity signals for cooperative working with the three pulse width modulation signals.

Figure 3:
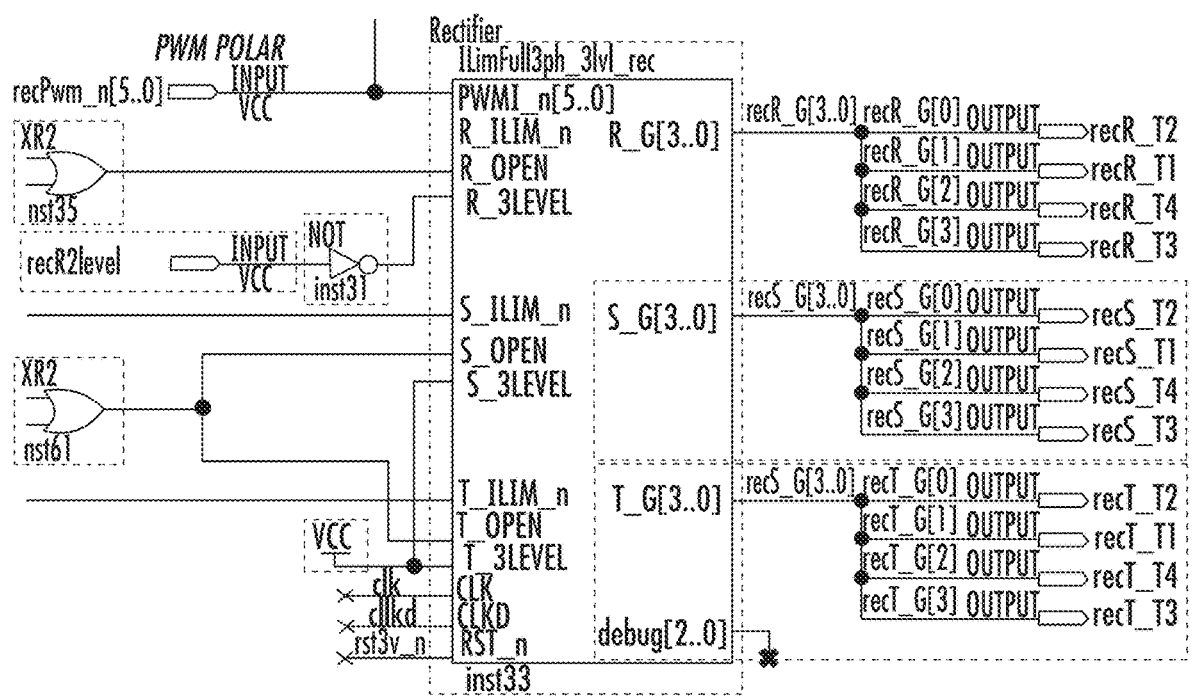
FIG. 3 is a diagram illustrating a relevant logic topological structure of a complex programmable logic device (CPLD) chip in a carrier signal generator according to some embodiments of the present inventive concept.

Referring now to FIG. 3, a relevant logic topological structure of a CPLD chip in a carrier signal generator according to some embodiments of the present inventive concept will be discussed. For the leg dual-use current conversion circuit 11 shown in FIG. 1, FIG. 3 shows a signal input terminal and three signal output terminals (R_G[3 . . . 0], S_G[3 . . . 0] and T_G[3 . . . 0]) of a CPLD chip for controlling the leg dual-use current conversion circuit, wherein the signal input terminal includes six channels to receive a six-channel signal output by the corresponding second DSP chip $DSP_2$ in the same slave processing module 22 as the signal input terminal. Each of the three signal output terminals of the CPLD chip outputs four pulse width modulation signals. For example, as shown in FIG. 3, the signal output terminal S_G[3 . . . 0] of the CPLD chip corresponding to phase S outputs four pulse width modulation signals: recS_T2, recS_T1, recS_T4 and recS_T3. Thus, the pulse width modulation signals output by the CPLD chip through the three signal output terminals respectively control R, S and T-phase rectification or inverter circuits, so as to perform current conversion between an AC terminal and a DC terminal or between a DC terminal and a DC terminal. However, for the sake of brief description, a structural illustration of control signals for controlling the transistors T1 to T4 of the first leg unit LegA of the leg dual-use current conversion circuit 11 is omitted in FIG. 3, and a control process of the first leg unit LegA will be explained in detail below. In addition, the four control signals output by each of the three signal output terminals (R_G[3 . . . 0], S_G[3 . . . 0] and TG[3 . . . 0]) are also suitable for controlling a conventional three-level current conversion circuit 41 shown in FIG. 4 that is connected to any phase of the mains.

Figure 4:
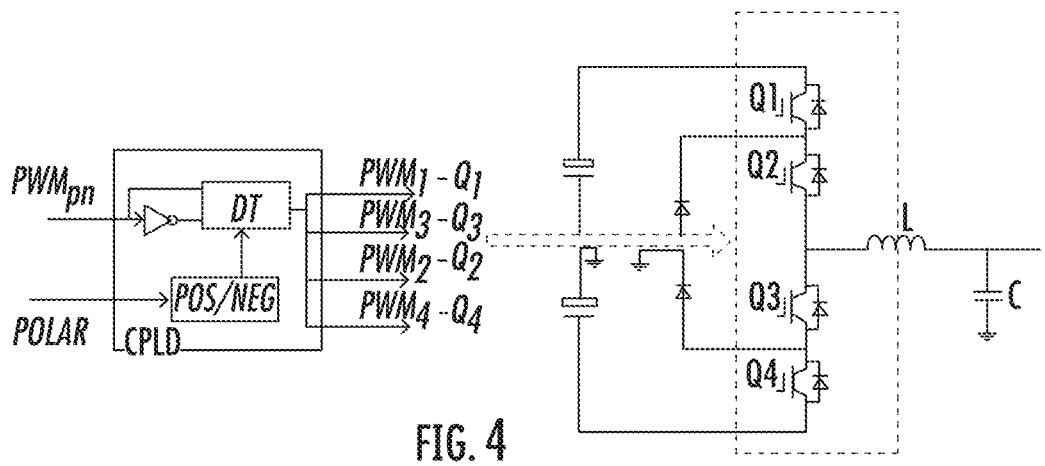
FIG. 4 is a schematic diagram illustrating a principle by which a carrier signal generator is used to control a conventional three-level current conversion circuit to perform AC-DC/DC-AC conversion according to some embodiments of the present inventive concept.

FIG. 4 schematically shows the principle by which a carrier signal generator is used to control a conventional three-level current conversion circuit to perform AC-DC/DC-AC conversion according to some embodiments of the present inventive concept.

The right side of FIG. 4 only illustratively shows a conventional three-level current conversion circuit 41 corresponding to one-phase (i.e., R-phase, S-phase, or T-phase) AC power of three phases in one UPM. The conventional three-level current conversion circuit 41 includes four insulated gate bipolar transistors Q1, Q2, Q3 and Q4 having reverse diodes and connected in series in the same direction, wherein a collector of the transistor Q1 is connected to the positive DC bus, and an emitter of the transistor Q4 is connected to the negative DC bus, a node formed by connecting an emitter of the transistor Q2 and a collector of Q3 is connected to unidirectional AC power through an inductor L, and another unidirectional conductive branch is formed by two diodes connected in series in the same direction, the current direction thereof being directed from a node formed by the connection between an emitter of Q3 and a collector of Q4 to a node formed by the connection between an emitter of Q1 and a collector of Q2.

The left side of FIG. 4 shows a schematic diagram of input and output parts of a CPLD chip part in a slave processing module of the carrier signal generator 40. The CPLD chip part receives intermediate-stage signals (which include a pulse width modulation signal $PWM_{pn}$ and a periodic polarity signal Polar) output from the $DSP_2$ chip in the slave processing module, and according to polarity period information (which is used to determine whether an AC voltage waveform to be rectified is in a positive half cycle or a negative half cycle) provided by the periodic polarity signal Polar and a requirement for a dead time in a DT module (the dead time is greater than zero in this circuit), outputs four pulse width modulation signals which are used to control the transistors Q1 to 04, respectively.

The process in which the carrier signal generator 40 controls the conventional three-level current conversion circuit 41 to rectify and output the mains to a DC bus is as follows. The carrier signal generator 40 is configured to output a first type of pulse width modulation signal when it is detected that the mains is normal. The pulse width modulation signal controls a switch of the conventional three-level current conversion circuit 41 to perform pulse width modulation. Q1 and Q3 are controlled to be turned on in a complementary manner, and Q2 and Q4 are also controlled to be turned on in a complementary manner. When an input voltage of an AC input terminal is in a positive polarity cycle, the periodic polarity signal is at a high level (indicating that the polarity is positive), and the CPLD outputs, according to the periodic polarity signal, a first group of control signals for controlling Q1-Q4. The control signals control Q1 and Q3 to implement pulse width modulation, and at the same time control Q2 to be turned on and Q4 to be turned off. During this cycle, the input voltage of the mains supplies a positive DC voltage boosted by BOOST to the positive DC bus. When an input current of the AC input terminal is in a negative polarity cycle, the periodic polarity signal is at a low level (indicating that the polarity is negative), and the CPLD outputs, according to the periodic polarity signal, a second group of control signals for controlling Q1-Q4. The control signals control Q2 and Q4 to implement pulse width modulation, and at the same time control Q3 to be turned on and Q1 to be turned off. During this cycle, the input voltage of the mains supplies a negative DC voltage boosted by BOOST to the negative DC bus.

The process in which the carrier signal generator 40 controls the conventional three-level current conversion circuit 41 to invert DC power into AC power is as follows. The carrier signal generator 40 is configured to output a second type of pulse width modulation signal when it is detected that DC power needs to be converted into AC power. Q1 and Q3 are controlled to be turned on in a complementary manner, and Q2 and Q4 are also controlled to be turned on in a complementary manner. When a voltage that needs to be output by an AC output terminal is in a positive polarity cycle, the periodic polarity signal is at a high level, and the CPLD outputs, according to the periodic polarity signal, a third group of control signals for controlling Q1-Q4. The control signals control Q1 and Q3 to implement pulse width modulation, and at the same time control Q2 to be turned on and Q4 to be turned off. During this cycle, the voltage of the positive DC bus is used to output a positive half-cycle AC voltage boosted by BOOST to the AC output terminal. When the voltage that needs to be output by the AC output terminal is in a negative polarity cycle, the periodic polarity signal is at a low level, and the CPLD outputs, according to the periodic polarity signal, a fourth group of control signals for controlling Q1-Q4. The control signals control Q2 and Q4 to implement pulse width modulation, and at the same time control Q3 to be turned on and Q1 to be turned off. During this cycle, the voltage of the negative DC bus is used to output a negative half-cycle AC voltage boosted by BOOST to the AC output terminal.

Figure 5:
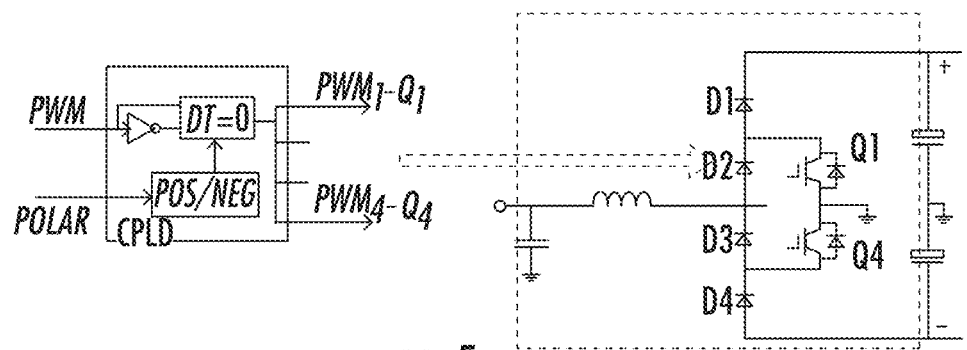
FIG. 5 is a schematic diagram illustrating the principle by which a carrier signal generator is used to control the leg dual-use current conversion circuit of the present inventive concept to perform AC-DC conversion in a UPS mains mode according to some embodiments of the present inventive concept.

FIG. 5 schematically shows the principle by which a carrier signal generator is used to control the leg dual-use current conversion circuit of the present inventive concept to perform AC-DC conversion in a UPS mains mode according to some embodiments of the present inventive concept.

The right side of FIG. 5 shows one of the R-phase, S-phase and T-phase dual boost rectification circuits of the second leg unit LegB of the leg dual-use current conversion circuit 11 shown in FIG. 1. The left side of FIG. 5 shows a schematic diagram of input and output parts of a CPLD chip part in a slave processing module of the carrier signal generator 40. The CPLD chip part receives intermediate-stage signals output from a $DSP_2$ chip in the slave processing module, such as a pulse width modulation signal $PWM_{pn}$ and a periodic polarity signal Polar, and according to positive and negative polarity conversion period (frequency) information (which is used to determine whether an AC voltage waveform to be rectified is in a positive half cycle or a negative half cycle) provided by the periodic polarity signal Polar and a requirement for a dead time in a DT module (the dead time is substantially equal to zero in this circuit), only two pulse width modulation signals out of the original four are normally output, i.e., signals $PWM_1$-$Q_1$ and $PWM_4$-$Q_4$ in FIG. 5, which are used to control transistors Q1 and Q4 of the dual boost rectification circuit of this phase to perform pulse width modulation, respectively.

When a carrier signal generator 50 is used to cooperate with the leg dual-use current conversion circuit 11 shown in FIG. 1 and detects that the AC mains at the input terminal is normal, the carrier signal generator 50 is configured to output a third type of pulse width modulation signal, i.e., three groups of dual boost rectification pulse width modulation signals with a phase difference of 120° between any two phases, which are used to control the R, S or T-phase dual boost rectification circuit of the second leg unit LegB of the leg dual-use current conversion circuit 11 to rectify the R, S or T-phase AC power input from the mains, respectively. Only phase S of the mains (Utility S) is taken as an example. When the S-phase AC power is in a positive half cycle, a switch transistor Q1 in the S-phase dual boost rectification circuit performs pulse width modulation, a switch transistor Q4 maintains to be turned off, and the S-phase dual boost rectification circuit outputs DC power to the positive DC bus and boosts it to supply power. When the S-phase AC power is in a negative half cycle, the switch transistor Q4 in the S-phase circuit performs pulse width modulation, the switch transistor Q1 maintains to be turned off, and the S-phase dual boost rectification circuit outputs DC power to the negative DC bus and boosts it to supply power. The output terminals of the R, S and T-phase dual boost rectification circuits are connected in parallel to the positive and negative DC buses, so the three-phase AC input of the mains is rectified and boosted to supply power to the positive and negative DC buses.

When the carrier signal generator 50 is used to cooperate with the leg dual-use current conversion circuit 11 shown in FIG. 1 and detects that the mains is normal and the electric quantity of the rechargeable battery is lower than a predetermined threshold, the carrier signal generator 50 is configured to simultaneously output the third type of pulse width modulation signal and a fourth type of pulse width modulation signal, wherein the third type of pulse width modulation signal has been described in detail above, and will not be redundantly described here. The fourth type of pulse width modulation signal group output by the carrier signal generator 50 are DC-DC buck pulse width modulation signals, which controls the first leg unit LegA (i.e., serving as a charging circuit) of the leg dual-use current conversion circuit 11 as shown in FIG. 1 to buck the voltages on the positive and negative DC buses so as to charge the rechargeable battery. During this charging process, input terminals of the bidirectional DC-DC circuit are connected to the positive and negative DC buses, respectively, and output terminals of the bidirectional DC-DC circuit are connected to the positive and negative electrodes of the rechargeable battery, respectively. Switch transistors T1, T2, T3 and T4 perform the following two steps alternately within the positive and negative half cycles predetermined according to the polarity periodic signal, respectively:

(1) controlling the switch transistors T2 and T4 to turn off in the positive half cycle; controlling the switch transistor T3 to turn on or off; and controlling the switch transistor T1 to perform pulse width modulation, wherein the bidirectional DC-DC circuit is equivalent to the buck circuit BUCK, and bucks and charges the rechargeable battery by a capacitor Cp; and (2) controlling the switch transistors T1 and T3 to turn off in the negative half cycle; controlling the switch transistor T2 to turn on or off; and controlling the switch transistor T4 to perform pulse width modulation, wherein the bidirectional DC-DC circuit is equivalent to the buck circuit BUCK, and bucks and charges the rechargeable battery by the capacitor Cp.

In addition, the carrier signal generator 50 can further be configured to control the first leg unit LegA of the leg dual-use current conversion circuit 11 to rectify the AC power input by the mains. On the basis of the teachings herein, a person skilled in the art would easily understand how to implement the control, which will not be redundantly described here.

Figure 6:
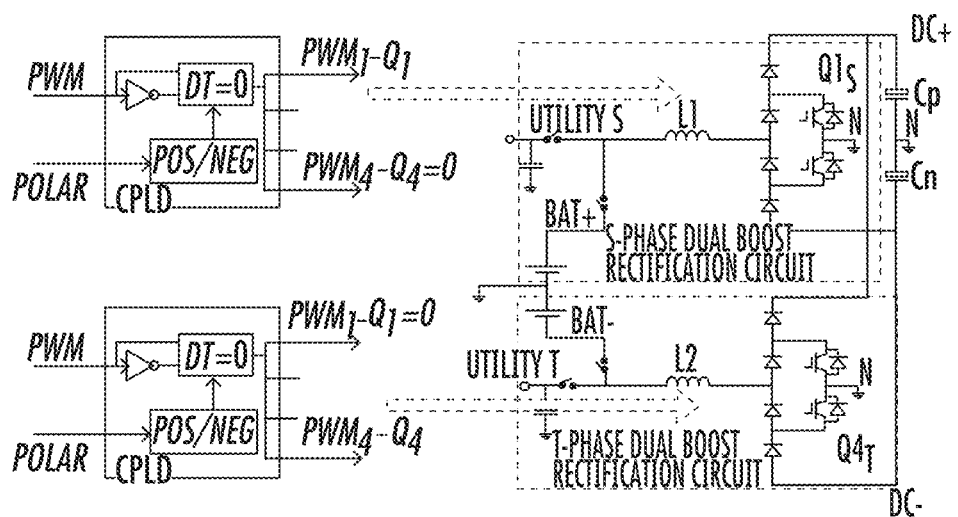
FIG. 6 is a schematic diagram illustrating the principle by which a carrier signal generator is used to control the leg dual-use current conversion circuit of the present inventive concept to perform DC-DC conversion in a UPS battery mode according to some embodiments of the present inventive concept.

FIG. 6 schematically shows the principle by which a carrier signal generator is used to control the leg dual-use current conversion circuit of the present inventive concept to perform DC-DC conversion in a UPS battery mode according to some embodiments of the present inventive concept.

The right side of FIG. 6 shows a schematic diagram in which the S-phase dual boost rectification circuit and the T-phase dual boost rectification circuit of the second leg unit LegB of the leg dual-use current conversion circuit 11 participating in current flow in the battery mode are connected between the positive and negative electrodes of the rechargeable battery and the positive and negative DC buses. The CPLD signal output schematic diagram at the upper left side of FIG. 6 shows that in the positive half cycle of the interleaved boosting process, the carrier signal generator 50 controls the S-phase dual boost rectification circuit to serve as a branch in the interleaved boosting topological structure (specifically, it will be interleaved with the positive-terminal leg of the first leg unit LegA shown in FIG. 1 to boost the positive DC bus). The CPLD signal output schematic diagram at the lower left side of FIG. 6 shows that in the negative half cycle of the interleaved boosting process, the carrier signal generator 50 controls the T-phase dual boost rectification circuit to serve as a branch in the interleaved boosting topological structure (specifically, it will be interleaved with the negative-terminal leg of the first leg unit LegA to boost the negative DC bus).

The interleaved boosting process is configured such that when the carrier signal generator 50 is used to cooperate with the leg dual-use current conversion circuit 11 shown in FIG. 1 and detects that the mains is abnormal, the carrier signal generator 50 is configured to generate a fifth type of pulse width modulation signal, which is an interleaving pulse width modulation signal, and controls the leg dual-use current conversion circuit to perform interleaved boosting on the battery voltage and supply power to the positive and negative DC buses. Boosting of the positive DC bus requires using the positive-terminal leg of the first leg unit LegA and the S-phase dual boost rectification circuit in the second leg unit LegB shown in FIG. 1 to perform an interleaved boosting process. Taking one cycle as an example (the pulse width modulation frequency and the corresponding cycle time here are different from the pulse width modulation frequency for dual boost rectification and the corresponding cycle time in Embodiment 5), the interleaved boosting process includes: the switch transistor T2 of the positive-terminal leg of the first leg unit LegA and the switch transistor $Q1_S$ in the S-phase dual boost rectification circuit of the second leg unit LegB respectively performing pulse width modulation by means of pulse width modulation waveforms which have the same frequency but are out of phase (phase difference) by 180°. The switch transistor $Q1_S$ and the switch transistor T2 that are turned on alternately have a dead time of zero, and the remaining switch transistors in the first leg unit LegA and the second leg unit LegB are turned off (that is, the pulse width modulation signals controlling the remaining switch transistors are the same and are constant low-level or high-level signals to turn them off). During this process, the battery voltage is boosted and discharged to the capacitor Cp, and the positive DC bus is boosted by BOOST.

Boosting of the negative DC bus requires using the negative-terminal leg of the first leg unit LegA and the T-phase dual boost rectification circuit in the second leg unit LegB shown in FIG. 1 to perform an interleaved boosting process. Taking one cycle as an example, the interleaved boosting process includes: the switch transistor T3 of the negative-terminal leg of the first leg unit LegA and the switch transistor $Q4_T$ in the T-phase dual boost rectification circuit of the second leg unit LegB respectively performing pulse width modulation by means of pulse width modulation waveforms which have the same frequency but are out of phase (phase difference) by 180°. The switch transistor COT and the switch transistor T3 that are turned on alternately have a dead time of zero, and the remaining switch transistors in the first leg unit LegA and the second leg unit LegB are turned off. During this process, the battery voltage is boosted and discharged to the capacitor Cn, and the negative DC bus is boosted by BOOST.

Figure 7:
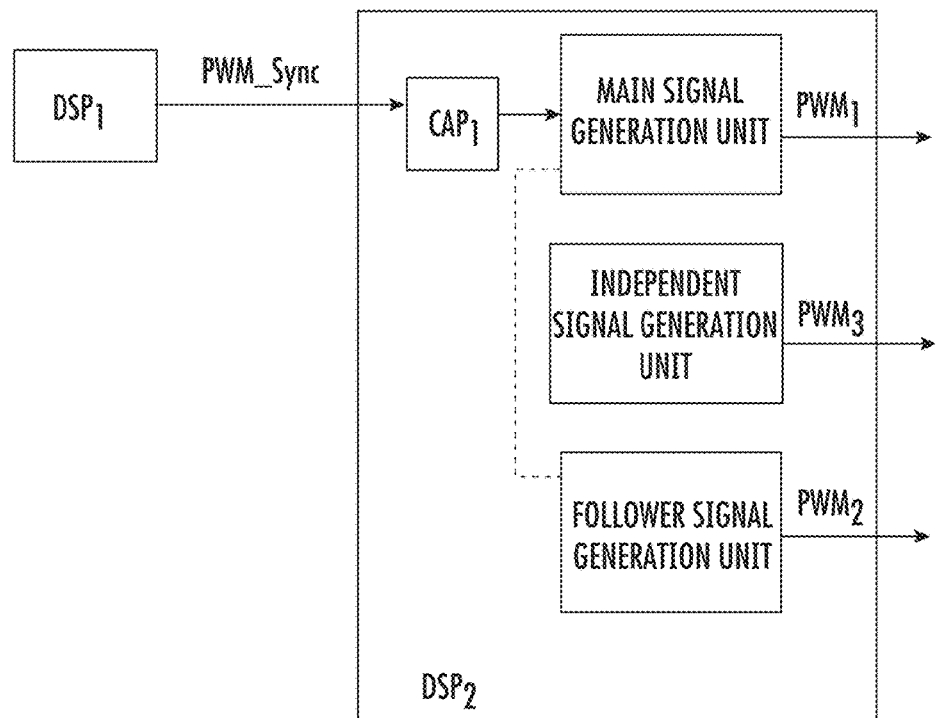
FIG. 7 is a schematic diagram illustrating a synchronous control logic of the carrier signal generator shown in FIG. 4 or 5 according to some embodiments of the present inventive concept for the conventional three-level current conversion circuit or leg dual-use current conversion circuit in a UPS mains mode.

FIG. 7 shows a schematic diagram of synchronous control logic of the carrier signal generator in the embodiment described in FIG. 4 or 5 according to the present inventive concept for the conventional three-level current conversion circuit or leg dual-use current conversion circuit in a UPS mains mode.

In the uninterruptible power supply (UPS) system, for the leg dual-use current conversion circuit 11 shown in FIG. 1 or the conventional three-level current conversion circuit 41 shown in FIG. 4, when the mains is normal, the carrier signal generator needs to output pulse width modulation signals to rectify the three-phase AC mains. In order to enable a current conversion circuit (whether it is the leg dual-use current conversion circuit 11 or the conventional three-level current conversion circuit 41) in a plurality of universal power unit (UPM) modules in the UPS system to reduce harmonic components when outputting a rectified waveform, the carrier signal generator needs to synchronize the pulse width modulation signals output by the respective UPMs. To this end, as shown in FIGS. 2A and 2B, the carrier signal generator 20 in the UPS system is provided with the master processing module 21 to send out a reference signal (referred to as a carrier synchronization signal PWM_Sync in the following specific description) that serves as a reference standard for each UPM module, and the respective slave processing modules 22, after receiving the reference signal, generate control signals for controlling current conversion circuits in the respective corresponding UPM modules.

Specifically, a carrier signal generator 60 as shown in detail in FIG. 7 has a structure similar to that of the carrier signal generator 20. A plurality of corresponding slave DSP chips $DSP_2$ in a plurality of universal power units UPM are controlled by a master $DSP_1$ chip in a master processing module. The $DSP_1$ chip in the master processing module of the carrier signal generator 60 outputs one carrier synchronization signal PWM_Sync as a reference signal, and the carrier synchronization signal PWM_Sync is a standard pulse width modulation signal required for the rectification of the R-phase, S-phase and T-phase dual boost rectification circuits. The $DSP_2$ chip in each slave processing module receives the carrier synchronization signal PWM_Sync from a respective signal capture unit $CAP_1$ and generates, on the basis of the carrier synchronization signal, a pulse width modulation signal used by the UPM module. The slave processing module $DSP_2$ shown in FIG. 7 includes a main signal generation module, an independent signal generation module, and a follower signal generation module. The main signal generation module receives the carrier synchronization signal PWM_Sync output by the signal capture unit, and generates, according to the carrier synchronization signal, a pulse width modulation signal $PWM_1$ as a first intermediate-stage signal, the pulse width modulation signal $PWM_1$ being used to control the R-phase dual boost rectification circuit to perform boosting and rectification, and being synchronized with the pulse width modulation waveform of the carrier synchronization signal PWM_Sync. The follower signal generation module is configured to be able to follow the main signal generation module to generate a pulse width modulation signal $PWM_2$ as a second intermediate-stage signal, and the pulse width modulation signal $PWM_2$ is used to respectively generate control signals capable of controlling the S-phase and T-phase dual boost rectification circuits to perform boosting and rectification, wherein the pulse width modulation signal $PWM_1$ is synchronized with the pulse width modulation signal $PWM_2$. The carrier synchronization signal PWM_Sync has a pulse width modulation frequency required for dual boost rectification.

When the mains is normal, the independent signal generation module of the slave processing module $DSP_2$ independently generates a pulse width modulation signal $PWM_3$ as a third intermediate-stage signal. The pulse width modulation signal $PWM_3$ is transferred and output by the CPLD to respectively control the positive-terminal leg and the negative-terminal leg of the first leg unit LegA. The voltages at the positive and negative DC bus terminals are bucked by BUCK to charge the rechargeable battery. Since the pulse width modulation waveform characteristics (such as frequency) required for the first leg unit LegA to charge the rechargeable battery by BUCK are not consistent with those required for the rectification of the second leg unit LegB, it is advantageous for the pulse width modulation signal $PWM_3$ to be generated independently of the pulse width modulation signal $PWM_1$.

It should be pointed out that the above carrier signal synchronization process is also applicable to the case of n slave processing modules (DSP$_2$, . . . , DSP$_n$, where n>2). Since each slave processing module receives the carrier synchronization signal PWM_Sync sent by the same master processing module DSP$_1$, the pulse width modulation signals used by the n slave processing modules to control their respective R-phase, S-phase and T-phase dual boost rectification circuits are all synchronized with each other.

Figure 8A:
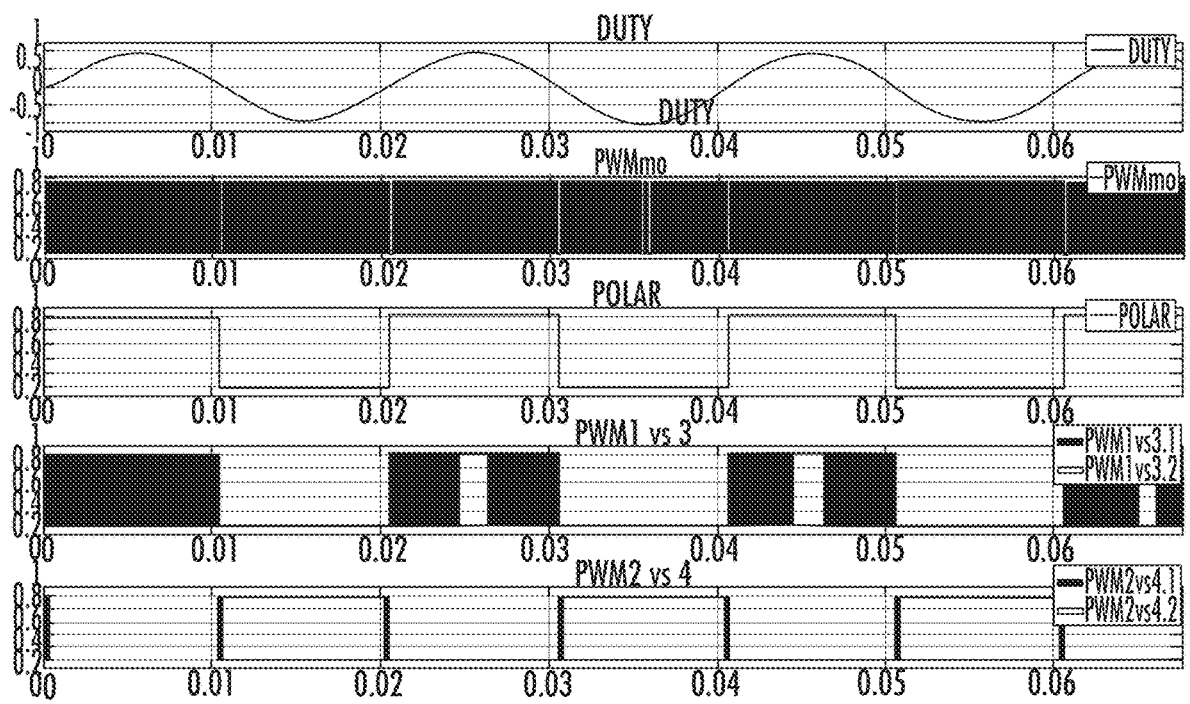
FIG. 8A is a diagram illustrating an example of a pulse width modulation signal output by the carrier signal generator illustrated in FIG. 4 according to some embodiments of the present inventive concept for the conventional three-level current conversion circuit.
Figure 8B:
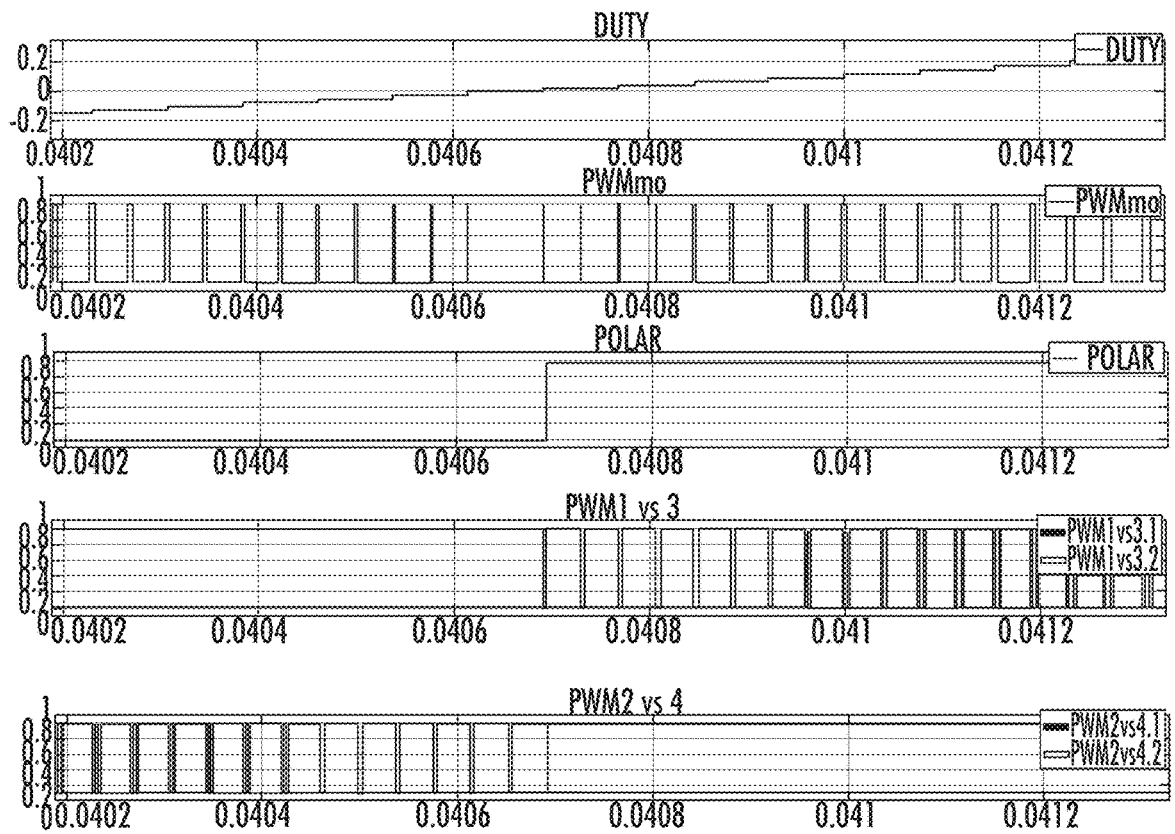
FIG. 8B is a diagram illustrating an enlarged schematic diagram of the pulse width modulation signal shown in FIG. 8A near a polarity period transition point of a pulse width polarity signal.

FIG. 8A shows an example of a pulse width modulation signal output by the carrier signal generator described in FIG. 4 according to the present inventive concept for the conventional three-level current conversion circuit, and FIG. 8B illustrates an enlarged schematic diagram of the pulse width modulation signal shown in FIG. 8A near a polarity period transition point of a pulse width polarity signal. The conventional three-level current conversion circuit is controlled by the carrier signal generator 60 to rectify one phase of the three-phase mains. FIG. 8A shows, in sequence from top to bottom, a modulation wave duty ratio, a pulse width modulation signal, a pulse width polarity signal, a superposition view of pulse width modulation signals for controlling the transistors Q1 and 03, and a superposition view of pulse width modulation signals for controlling the transistors Q2 and Q4. It can be seen from the enlarged schematic diagram of the pulse width modulation polarity transition point in FIG. 8B that for the conventional three-level current conversion circuit 41, there is a dead time in the switching of transistors near the transition point.

Figure 9A:
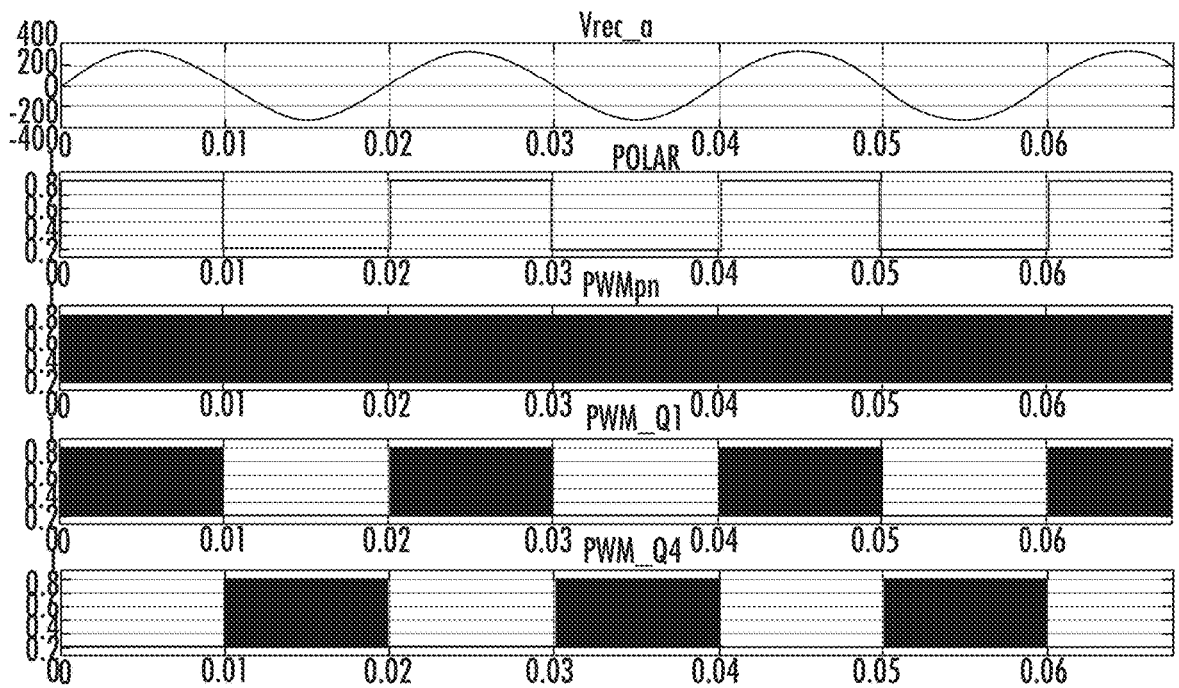
FIG. 9A is a diagram illustrating an example of a pulse width modulation signal output by the carrier signal generator shown in FIG. 5 according to some embodiments of the present inventive concept for a unidirectional R-phase, S-phase or T-phase dual boost rectification circuit of the leg dual-use current conversion circuit of the present inventive concept.
Figure 9B:
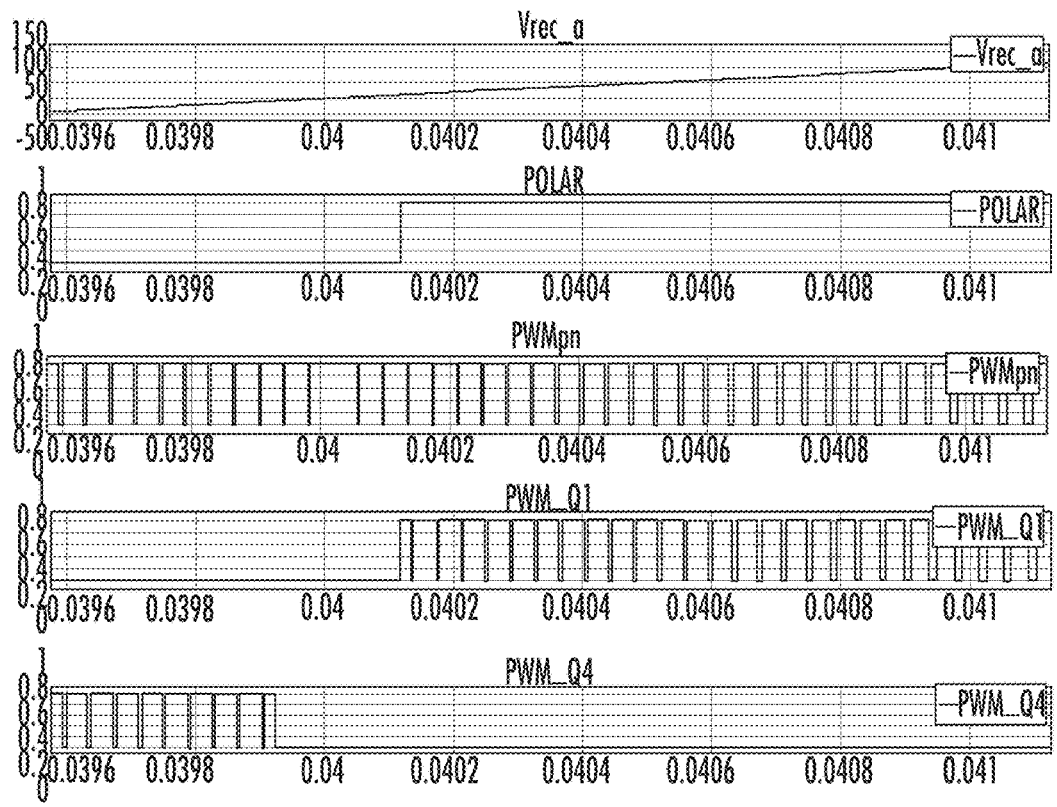
FIG. 9B is a diagram illustrating an enlarged schematic diagram of the pulse width modulation signal illustrated in FIG. 9A near a polarity period transition point of a pulse width polarity signal.

FIG. 9A shows an example of a pulse width modulation signal output by the carrier signal generator shown according to FIG. 5 for a unidirectional R-phase, S-phase or T-phase dual boost rectification circuit of the leg dual-use current conversion circuit of the present inventive concept, and FIG. 9B shows an enlarged schematic diagram of the pulse width modulation signal shown in FIG. 9A near a polarity period transition point of a pulse width polarity signal.

FIG. 9A shows, in sequence from top to bottom, a modulation wave duty ratio, a pulse width polarity signal, a superposition view of pulse width modulation signals for controlling the transistors Q1 and Q4, a pulse width modulation signal separately shown in a positive half cycle for controlling a control terminal of the transistor Q1, and a pulse width modulation signal in a negative half cycle for controlling a control terminal of the transistor Q4. As shown in FIG. 9A by way of example, the leg dual-use current conversion circuit is controlled by the carrier signal generator 60 to rectify one phase of the three-phase mains. It can be seen from the enlarged schematic diagram of the pulse width modulation polarity transition point in FIG. 98 that for the conventional three-level current conversion circuit 41, there is substantially no dead time in the switching process of transistors near the transition point.

Figure 10:
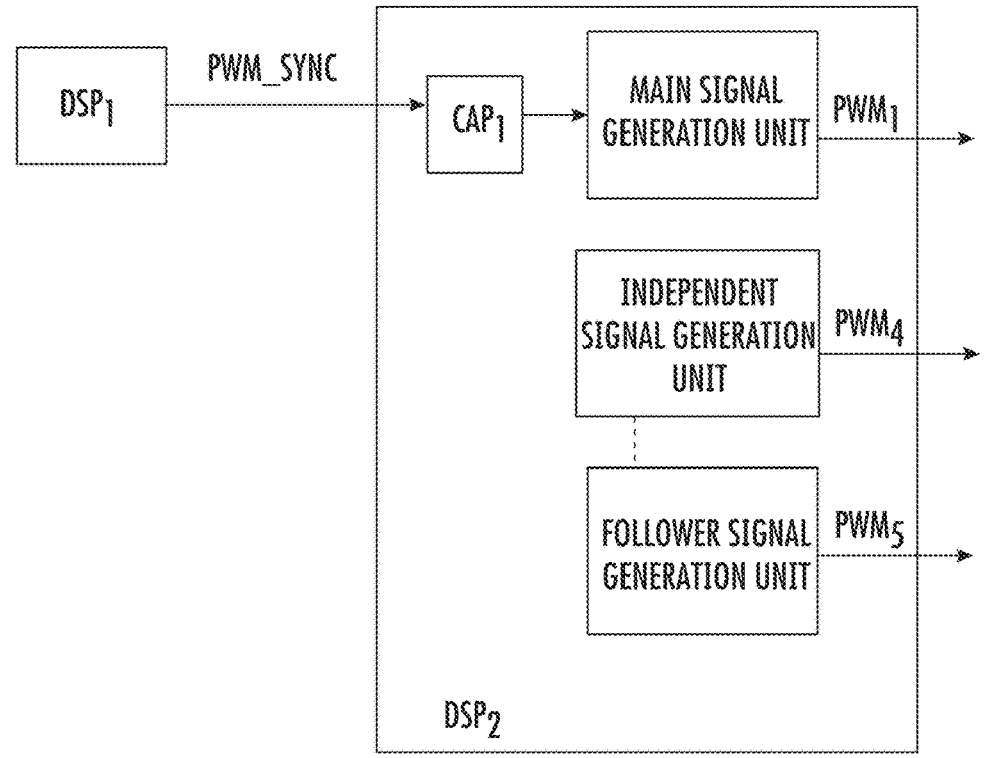
FIG. 10 is a diagram illustrating a schematic diagram of synchronous control logic of the carrier signal generator shown in FIG. 4 or 5 according to some embodiments of the present inventive concept for the conventional three-level current conversion circuit or leg dual-use current conversion circuit in a UPS battery mode.

FIG. 10 shows a schematic diagram of synchronous control logic of the carrier signal generator in FIG. 4 or 5 according to the present inventive concept for the conventional three-level current conversion circuit or leg dual-use current conversion circuit in a UPS battery mode.

When the mains is abnormal, the carrier signal generator enters the battery mode. The conventional three-level current conversion circuit 41 or the leg dual-use current conversion circuit 11 needs to boost and discharge the voltage of the rechargeable battery to the positive and negative DC buses. Similar to the mains mode, the master processing module DSP$_1$ still outputs a carrier synchronization signal PWM_Sync, and the plurality of slave processing modules (such as DSP$_2$) receive the carrier synchronization signal PWM_Sync from their respective signal capture units CAP (such as CAP$_1$) and generate a pulse width modulation signal PWM$_1$ (i.e., the first intermediate-stage signal, the generated signal not being used in this mode) on the basis of the carrier synchronization signal PWM_Sync. Since the control module controls the current conversion circuit to obtain power from the positive and negative electrodes of the rechargeable battery when the mains is abnormal, there is no need to consider the current phase superposition problem associated with AC power supply, that is, it is not necessary to cause the pulse width modulation signals acquired by BOOST and output by the respective slave processing modules to be synchronized with each other. It is desirable that the slave processing modules associated with the respective universal power modules generate pulse width modulation signals for controlling the first leg unit LegA and the second leg unit LegB to perform interleaved boosting independently of each other. In the following, taking the slave processing module DSP$_2$ as an example for explanation, the independent signal generation module of the slave processing module DSP$_2$ independently generates a pulse width modulation signal PWM$_4$ as a fourth intermediate-stage signal, and a control signal for controlling the first leg unit LegA is generated from the pulse width modulation signal PWM$_4$ in the CPLD chip. The follower signal generation module generates a pulse width modulation signal PWM$_5$ as a fifth intermediate-stage signal according to the pulse width modulation signal PWM$_4$ generated by the independent signal generation module, and the pulse width modulation signal PWM$_5$ is used for controlling the S-phase and T-phase dual boost rectification circuits in the second leg unit LegB to be used as a dual-use leg in an interleaved boost circuit. The pulse width modulation waveforms of the pulse width modulation signal PWM$_5$ and the pulse width modulation signal PWM$_4$ are synchronized, and both are set to a pulse width modulation frequency $f_{s\_boost}$ required for boosting by BOOST. The phase difference between the pulse width modulation signal PWM$_5$ and the pulse width modulation signal PWM$_4$ is set to be 180°. Thus, the out-of-phase configuration enables the first leg unit LegA and the second leg unit LegB to cooperate to achieve interleaved boosting.

Figure 11A:
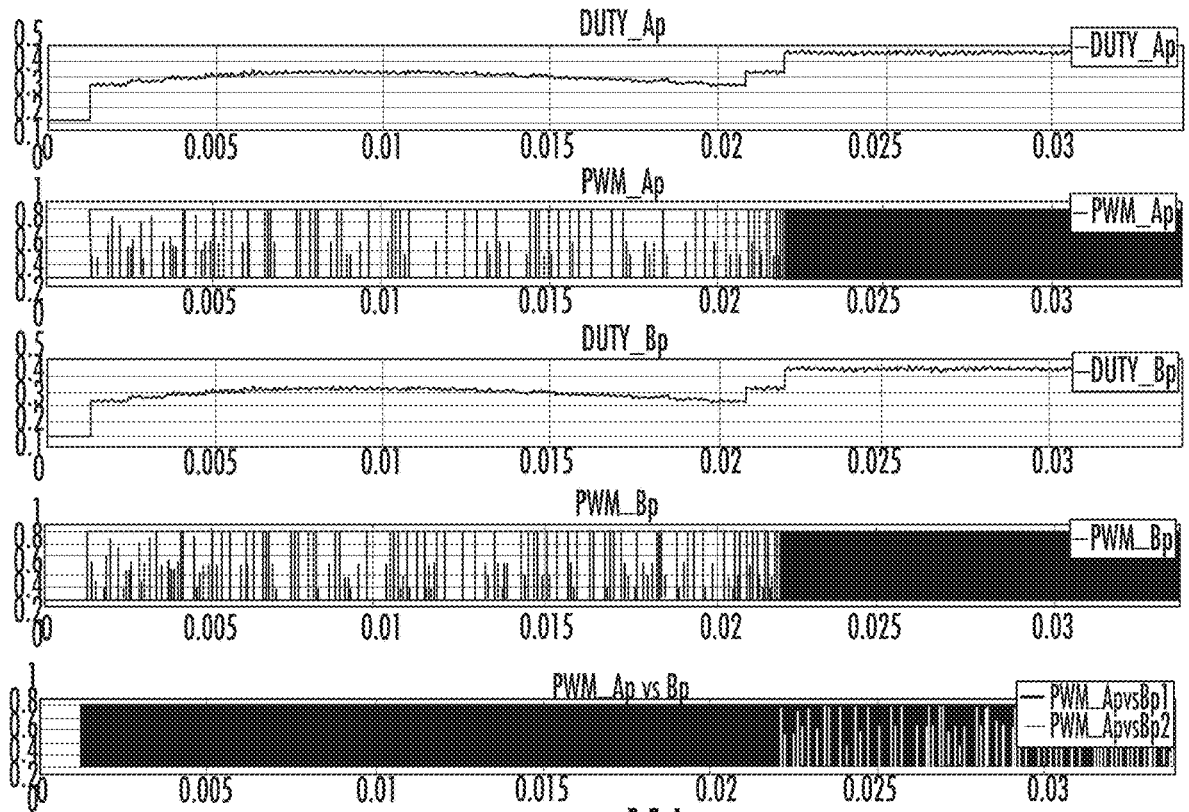
FIG. 11A is a diagram illustrating an example of a positive half cycle of a pulse width modulation signal output by the carrier signal generator shown in FIG. 5 according to some embodiments of the present inventive concept for the leg dual-use current conversion circuit in a battery mode of an uninterruptible power supply.
Figure 11B:
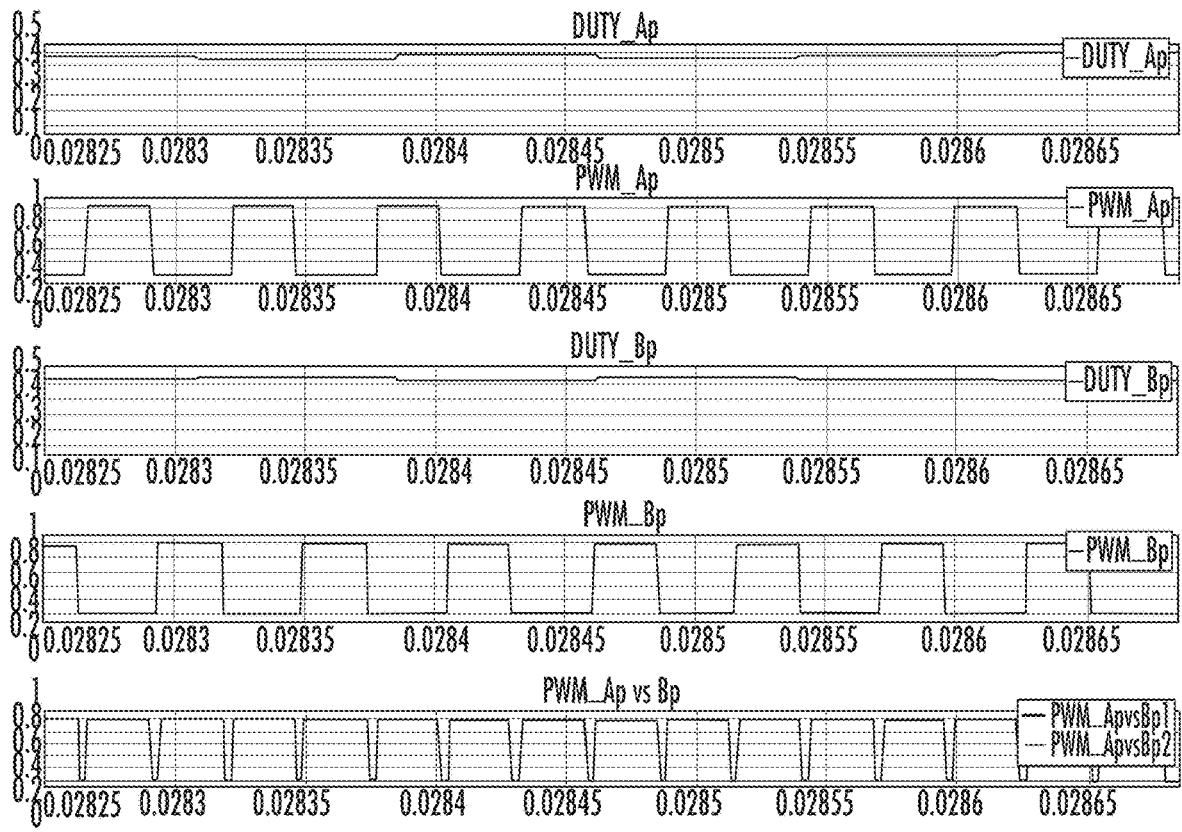
FIG. 11B is a diagram illustrating a partially enlarged schematic diagram of the pulse width modulation signal shown in FIG. 11A in a steady state.

FIG. 11A shows an example of a positive half cycle of a pulse width modulation signal output by the carrier signal generator according to Embodiment 5 of the present inventive concept for the leg dual-use current conversion circuit in a battery mode of an uninterruptible power supply, and FIG. 11B shows a partially enlarged schematic diagram of the pulse width modulation signal shown in FIG. 11A in a steady state. FIG. 11A shows, in sequence from top to bottom, a positive half-cycle duty ratio corresponding to the first leg unit LegA, a positive half-cycle pulse width modulation waveform corresponding to the first leg unit LegA, a positive half-cycle duty ratio corresponding to the second leg unit LegB, a positive half-cycle pulse width modulation waveform corresponding to the second leg unit LegB, and a schematic diagram of the superposition of the positive half-cycle pulse width modulation waveforms corresponding to the first leg unit LegA and the second leg unit LegB. The superposed schematic diagram shown in FIG. 11B shows an enlarged diagram. Obviously, the pulse width modulation waves assigned to the first leg unit LegA and the second leg unit LegB are interleaved with each other at a phase angle of 180°, indicating that they can perform interleaved boosting with high precision.

In various embodiments of the present inventive concept, the carrier signal generator can also be used to output a control signal at the moment when it is detected that it is about to enter the battery mode, so that the AC switch group of the current conversion circuit is turned off and the DC switch group is turned on. Therefore, the current conversion circuit is disconnected from the input terminal of the mains and is powered by the discharge of the rechargeable battery. Alternatively, the carrier signal generator can also be used to output a control signal at the moment when it is detected that it is about to enter the mains mode, so that the DC switch group of the current conversion circuit is turned off and the AC switch group is turned on. Therefore, the current conversion circuit is disconnected from the rechargeable battery and is powered by the input terminal of the mains. On the basis of the teaching herein, a person skilled in the art would easily understand how to implement the control, which will not be redundantly described here.

Although the present inventive concept has been described through embodiments, the present inventive concept is not limited to the embodiments described herein, but includes various changes and variations made without departing from the scope of the present inventive concept.

That which is claimed is:

1. A carrier signal generator for an uninterruptible power supply, the uninterruptible power supply including N universal power units, and each of the N universal power units supplying an uninterruptible power supply output from mains or a rechargeable battery to a load, the carrier signal generator comprising:
a master processing module that outputs a corresponding reference signal according to a normal or abnormal state of the mains supplying power to each of a plurality of universal power units of the uninterruptible power supply; and
N slave processing modules, having input terminals coupled to the master processing module, and output terminals coupled to corresponding universal power units, wherein the slave processing modules are used to synchronously receive the reference signal and to control the corresponding universal power units to receive power from the mains or a corresponding rechargeable battery;
wherein when the mains is normal, each slave processing module generates a three-phase rectification control signal synchronized with the reference signal, and the three-phase rectification control signal is configured to control a corresponding universal power unit, so that the N universal power units synchronously rectify and output power from the mains; and
when the mains is abnormal, the N slave processing modules generate corresponding first DC-DC control signals independently of each other, and each first DC-DC control signal controls a corresponding universal power unit so as to perform DC conversion and output power from the corresponding rechargeable battery.

2. The carrier signal generator of claim 1, wherein the master processing module comprises a first digital signal processing chip, and the slave processing module comprises a second digital signal processing chip and a complex programmable logic device chip.

3. The carrier signal generator of claim 2, wherein the second digital signal processing chip comprises a main signal generation module, an independent signal generation module, and a follower signal generation module;
wherein the main signal generation module receives the reference signal and generates a first intermediate-stage signal according to the reference signal; and
when the master processing module determines that the mains is normal, the follower signal generation module generates a second intermediate-stage signal according to the main signal generation module, and the complex programmable logic device chip outputs the three-phase rectification control signal according to the first and second intermediate-stage signals.

4. The carrier signal generator of claim 3, wherein when the master processing module determines that the mains is normal and an electric quantity of the rechargeable battery for the corresponding universal power unit is lower than a predetermined threshold, the independent signal generation module generates a third intermediate-stage signal independently of the reference signal, the complex programmable logic device chip outputs a second DC-DC control signal according to the third intermediate-stage signal, and the second DC-DC control signal controls the corresponding universal power unit to supply DC power to two ends of the rechargeable battery.

5. The carrier signal generator of claim 3, wherein when the master processing module determines that the mains is abnormal, the independent signal generation module independently generates a fourth intermediate-stage signal, and the follower signal generation module synchronously generates a fifth intermediate-stage signal according to the fourth intermediate-stage signal, and
the complex programmable logic device chip generates the first DC-DC control signal according to the fourth and fifth intermediate-stage signals.

6. The carrier signal generator of claim 1, wherein the master processing module comprises a first digital signal processing chip, and the slave processing module comprises a second digital processing chip and a field-programmable gate array chip.

7. The carrier signal generator of claim 6, wherein the second digital signal processing chip comprises a main signal generation module, an independent signal generation module, and a follower signal generation mode,
wherein the main signal generation module receives the reference signal and generates a first intermediate-stage signal according to the reference signal; and
when the master processing module determines that the mains is normal, the follower signal generation module generates a second intermediate-stage signal according to the main signal generation modules, and the field-programmable gate array chip outputs the three-phase rectification control signal according to the first and second intermediate-stage signals.

8. The carrier signal generator of claim 7, wherein when the master processing module determines that the mains is normal and an electric quantity of the rechargeable battery for the corresponding universal power unit is lower than a predetermined threshold, the independent signal generation module generates a third intermediate-stage signal independently of the reference signal, the field-programmable gate array chip outputs a second DC-DC control signal according to the third intermediate-stage signal, and the second DC-DC control signal controls the corresponding universal power unit to supply DC power to two ends of the rechargeable battery.

9. The carrier signal generator of claim 7, wherein when the master processing module determines that the mains is abnormal, the independent signal generation module independently generates a fourth intermediate-stage signal, and the follower signal generation module synchronously generates a fifth intermediate-stage signal according to the further intermediate-stage signal; and the field-programmable gate array chip generates the first DC-DC control signal according to the fourth and fifth intermediate-stage signals.

10. The carrier signal generator of claim 1, wherein the universal power unit comprises first and second leg units, wherein the first leg unit comprises a positive-terminal leg connected between a positive electrode of the rechargeable battery and a positive DC bus, and a negative-terminal leg connected between a negative electrode of the rechargeable battery and a negative DC bus, and the first leg unit is used to provide a bidirectional DC path between the rechargeable battery and the positive and negative DC buses; and the second leg unit comprises first, second and third rectification circuits, wherein an input terminal of the first rectification circuit is selectively connected to a first phase of the mains or the positive electrode of the rechargeable battery, an input terminal of the second rectification circuit is selectively connected to a second phase of the mains or the negative electrode of the rechargeable battery, an input terminal of the third rectification circuit is connected to a third phase of the mains, and output terminals of the first, second and third rectification circuits are connected in parallel to the positive and negative DC buses.

11. The carrier signal generator of claim 10, wherein when the master processing module determines that the mains is abnormal, the input terminals of the first and second rectification circuits are configured to be connected to the positive and negative electrodes of the rechargeable battery, respectively, and the first DC-DC control signal controls the positive-terminal leg and the negative-terminal leg of the first leg unit and the first and second rectification circuits of the second leg unit to perform interleaved boosting to output power from the rechargeable battery to the load.

12. The carrier signal generator of claim 10, wherein when the master processing module determines that the mains is normal, the input terminals of the first and second rectification circuits are configured to be connected to the first and second phases of the mains, respectively, and the three-phase rectification control signal controls the first, second and third rectification circuits to rectify and output a three-phase AC voltage of the mains to the positive and negative DC buses.

13. The carrier signal generator of claim 12, wherein when the master processing module determines that an electric quantity of the rechargeable battery for the corresponding universal power unit is lower than a predetermined threshold, the second DC-DC control signal controls the positive-terminal leg and the negative-terminal leg of the first leg unit to charge a voltage on the positive and negative DC buses to two ends of the rechargeable battery.

14. An uninterruptible power supply system, comprising:
a plurality of universal power units; and
a carrier signal generator comprising:
a master processing module that outputs a corresponding reference signal according to a normal or abnormal state of the mains supplying power to each of a plurality of universal power units of the uninterruptible power supply; and
N slave processing modules, having input terminals coupled to the master processing module, and output terminals coupled to corresponding universal power units, wherein the slave processing modules are used to synchronously receive the reference signal and to control the corresponding universal power units to receive power from the mains or a corresponding rechargeable battery;
wherein when the mains is normal, each slave processing module generates a three-phase rectification control signal synchronized with the reference signal, and the three-phase rectification control signal is configured to control a corresponding universal power unit, so that the N universal power units synchronously rectify and output power from the mains; and
when the mains is abnormal, the N slave processing modules generate corresponding first DC-DC control signals independently of each other, and each first DC-DC control signal controls a corresponding universal power unit so as to perform DC conversion and output power from the corresponding rechargeable battery;
wherein a first end of the universal power unit is connected to one of mains or a rechargeable battery, and a second end of the universal power unit is connected to a load, and according to the control signals generated by the carrier signal generator, the mains or the rechargeable battery is controlled to supply power to the load, and/or the rechargeable battery is charged by the mains, wherein the control signals are configured to control the respective universal power unit synchronously.

* * * * *